United States Patent Office 3,131,720
Patented May 5, 1964

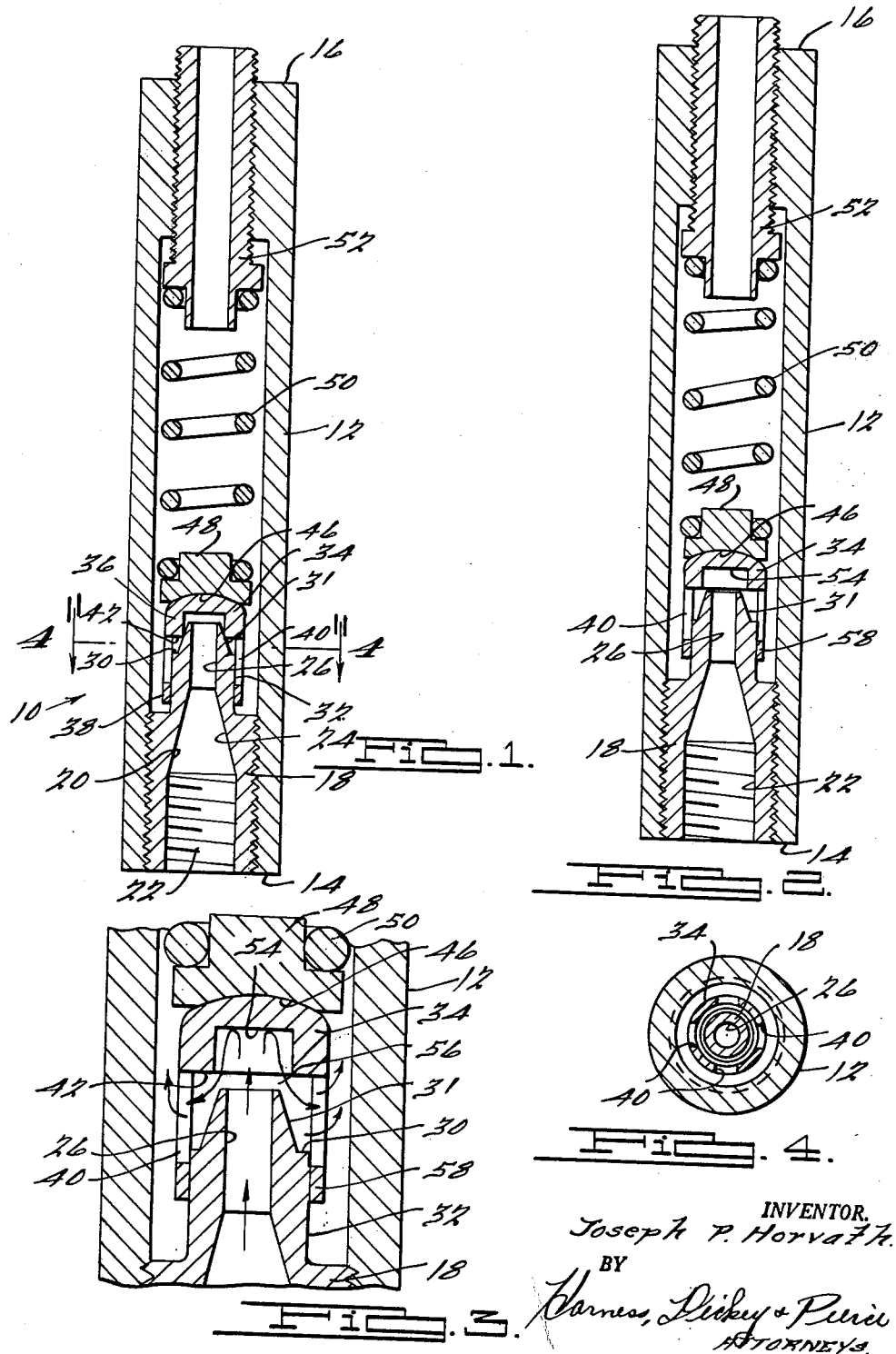

3,131,720
RELIEF VALVE
Joseph P. Horvath, 242 Concord Road, Wayland, Mass.
Filed Dec. 30, 1960, Ser. No. 79,613
8 Claims. (Cl. 137—543.23)

This invention relates generally to valves and more particularly to an improved relief valve.

The usual relief valve, which is designed to protect a system by relieving a volume of fluid at a predetermined pressure setting, includes a spring-urged poppet, ball or plunger and has a tendency to chatter, which causes damage to both the valve itself and the system which it is designed to protect. This oscillation or chatter of the valve is due to the fact that when the valve opens at the predetermined pressure setting, there is an instantaneous pressure decrease at the valve seat, due to the high velocity of the fluid, with a corresponding increase in the force applied to the valve member by the spring due to compression of the spring. The net effect of this change of forces is a closing of the valve for an instant sufficient for the pressure to again build up and repeat the cycle. It is an object of this invention, therefore, to provide a relief valve in which this tendency to chatter is eliminated. This is accomplished by forming the valve member so that the momentum force of the fluid being relieved through the valve is utilized to assist the pressure force of the fluid on the valve to hold the valve open.

A further object of this invention is to provide a relief valve which is simple in construction, economical to manufacture, and easily installed in a system.

Further objects, features and advantages of this invention will become apparent from a consideration of the following description, the appended claims and the accompanying drawing in which:

FIGURE 1 is a longitudinal sectional view of the valve of this invention, shown in a closed position;

FIGURE 2 is a longitudinal sectional view, illustrated similarly to FIG. 1, showing the valve in an open position;

FIGURE 3 is an enlarged fragmentary sectional view of the valve of this invention showing the valve in an open position; and FIGURE 4 is a transverse sectional view as seen along the line 4—4 in FIG. 1.

With reference to the drawing, the valve of this invention, indicated generally at 10, is illustrated in FIG. 1 as including an elongated casing or housing 12 having an inlet end 14 and an outlet end 16. Threaded within the inlet end 14 of the casing 12 is a stationary poppet or valve member 18 which is provided with a nozzle-shape axial bore 20 for maximum flow efficiency. Stated otherwise, the bore 20 has a threaded outer end portion 22 for connecting the casing 12 in a system, a tapering intermediate portion 24, and a reduced diameter inner end portion 26. The inner or outlet end portion of the poppet member 18 is formed with a tapered outer surface 31, and the outer surface 32 of the poppet member 18 axially next to the surface 31 is generally cylindrical in shape. The surfaces 31 and 32 are separated by a transverse shoulder 30.

A movable set member 34, which is telescoped over the inner end of the poppet member 18, has a generally inverted cup-shape head portion 36 and a depending cylindrical sleeve 38 which is formed with openings 40 and is slidably supported on the cylindrical surface 32. The inner surface of the movable seat member 34 is formed with a transverse shoulder 42 which is engageable with the inclined surface 31 to close the valve 10. The outer surface of the head portion 36 is of a convex shape so that it nests within a cavity 46 formed in the end of an anti-side load body member 48 which is urged into engagement with the head portion 36 by one end of a spring 50 which at its opposite end is disposed on a tubular spring centering member 52 which is threaded into the outlet end 16 of the casing 12.

In the operation of the valve 10, the pressure of fluid supplied to the inlet end 14 of the casing 12 is applied to the transversely extending surface 54 on the inside of the movable seat or valve member 34. The total force of this fluid on the surface 54 is resisted by the spring 50 so as to maintain the valve 10 closed until this force exceeds the force of the spring 50. At such time, the movable valve member 34 is moved in a direction away from the stationary poppet member 18 so that fluid flows out the portion 26 of the bore 20 in the poppet member 18, strikes the surface 54 on the movable seat member 34, and is deflected in a reverse direction through the space 56 between the valve members 18 and 34 into engagement with the shoulder 30 on the stationary poppet member 18. The shoulder 30 deflects the fluid so that it flows in a direction transversely of the casing 12 into engagement with the walls of the casing for ultimate flow through the outlet member 52. The portion 58 of the movable seat member 34 at the inner ends of the openings 40 is spaced a sufficient distance from the shoulder 30 to prevent any engagement of the fluid with the portions 58 so as to exert any fluid force on the seat member 34 in a direction opposite to the direction in which the seat member 34 moves toward an open position.

As a result, the increase in the force exerted on the seat member 34 by the compression of the spring 50 caused by opening movement of the seat member 34 is counteracted by the momentum force of the fluid flowing through the stationary poppet member 18 and transferred to the movable seat member 34. The substantially complete reversal in direction which the fluid undergoes when it engages the seat member 34 provides for a maximum utilization of this momentum force for counteracting the spring 50. The rate of the spring 50 determines the extent to which its increase in force on the seat member 34, caused by spring compression, will be counteracted by the momentum force. This makes it possible to determine the characteristics of the flow versus pressure curve for the valve 10 by selecting a particular spring rate. In other words, the pressure can be made rising, or constant with increased flow through the valve 10 until the valve saturates.

From the above description, it is seen that this invention provides a relief valve which utilizes the momentum force of the fluid flowing through the valve to maintain the valve open at the predetermined pressure setting without any oscillation or chatter of the valve. The shape of the bore 20 in the stationary poppet member 18 provides for a nozzle flow approach of the fluid to the movable seat member 34 to provide for a maximum flow of the fluid with minimum pressure loss while traveling into engagement with the movable seat member 34. The shoulder 30 on the stationary poppet member 18 prevents any transfer of force from the fluid to the movable seat member in a direction opposite to that desired.

It will be understood that the specific construction of the improved relief valve which is herein disclosed and described is presented for purposes of explanation and illustration and is not intended to indicate limits of the invention, the scope of which is defined by the following claims.

What is claimed is:

1. A relief valve comprising a stationary valve member having a passage therethrough for fluid, the outlet end portion of said stationary valve member having a generally cylindrical outer surface section and an inwardly tapered terminal end surface section axially adjacent thereto, said outer surface having a transverse shoulder between said surface sections, a movable valve member having a depending sleeve telescoped over said stationary valve member and slidably supported on said cylindrical surface, said movable valve member having means thereon for deflecting fluid issuing in one direction from said stationary valve member in a substantially opposite direction around said tapered surface into engagement with said shoulder which deflects fluid traveling in said opposite direction transversely of said first direction, spring means urging said movable valve member against said stationary valve member to close the valve, and means providing openings in said movable valve member for fluid traveling in said transverse direction.

2. A relief valve comprising a stationary member, passage means provided in said stationary member, a movable member telescopically mounted about said stationary member for movement between an open position and a closed position relative to said passage means, spring means biasing said movable member to the closed position, a discharge cavity formed in said movable member opposite said passage means and having an impact wall spaced opposite said passage means and extending at substantially right angles to the direction of flow of fluid from said passage means, a rim wall extending from said impact wall toward and beyond the end of said passage means, a seating surface defined by said rim wall and engaging said stationary member axially beyond the end of the passage means away from the impact wall to close said passage means and locate said impact wall in spaced relation to the end of said passage means and define a cavity portion spaced radially outwardly beyond the end of the passage means and extending axially beyond the end of the passage means in a direction opposite to the flow of fluid from said passage means to establish reverse flow of fluid immediately upon opening of said valve.

3. A relief valve comprising relatively movable members, means telescopically mounting said members for movement between an open position permitting flow through said valve and a closed position preventing flow through said valve, one member having a fluid passage extending longitudinally therethrough substantially parallel to the path of movement of said members relative to one another, an annular flow reversing cavity formed in the other member opposite said fluid passage, an impact wall formed by the bottom of said annular cavity and extending substantially transversely to the path of movement of said members relative to one another and substantially transversely to the path of fluid flowing through said fluid passage toward said annular cavity, a frustro-conical surface formed on the outer periphery of said one member about said fluid passage and extending into said annular cavity in the closed position and sealingly engaging the other member along an annular area of engagement, a transverse abutment wall formed on said one member at the end of said frustro-conical surface, fluid passage means formed in said other member opposite said transverse abutment and extending axially a sufficient distance to always be in alignment with said transverse abutment in the open position, centering means having abutting spherical surfaces mounted on said other member, spring means engaging said centering means and biasing said other member to the closed position through said centering means, the area of engagement between said abutting spherical surfaces being aligned with and extending radially outwardly beyond said annular area of engagement, a flow path provided through said valve by movement to the open position when the pressure of fluid in said fluid passage reaches a predetermined value comprising a first portion from said fluid passage to said impact wall at substantially right angles thereto and directly opposed to the bias of said spring means, a second portion reversely directed from the impact wall to the transverse abutment wall to provide sufficient dynamic force application to the impact wall from the velocity head of the fluid to compensate for reduction in static force application to the impact wall from the pressure head of the fluid at the beginning of flow and increase in spring force due to the spring rate and deflection of the spring upon opening of the valve to eliminate valve chatter, and a third portion substantially transverse to the first and second portions directed outwardly through said fluid passage means without adversely affecting the velocity head force tending to open said valve and eliminate valve chatter.

4. A relief valve comprising relatively movable members, means mounting said members for movement between an open position permitting flow through said valve and a closed position preventing flow through said valve, one member having a fluid passage extending therethrough, a flow reversing cavity formed in the other member opposite said fluid passage, an impact wall formed in said flow reversing cavity and having portions extending substantially transversely to the fluid flow path defined by said fluid passage, a tapered surface formed on the outer periphery of said one member and extending into said flow reversing cavity in the closed position and engaging the other member, and abutment means formed at the end of said tapered surface and intersecting said tapered surface to define a flow path extending transversely to the flow path defined by said tapered surface.

5. A relief valve comprising relatively movable members, means mounting said members for movement between an open position permitting flow through said valve and a closed position preventing flow through said valve, one member having a fluid passage extending longitudinally therethrough substantially parallel to the path of movement of said members relative to one another, an annular flow reversing cavity formed in the other member opposite said fluid passage, an impact wall formed by the bottom of said annular cavity and extending substantially transversely to the path of movement of said members relative to one another and substantially transversely to the path of fluid flowing through said fluid passage toward said annular cavity, a tapered surface formed on the outer periphery of said one member about said fluid passage and extending into said annular cavity in the closed position and engaging the other member along an annular area of engagement, a transverse abutment wall formed on said one member at the end of said tapered surface, fluid passage means formed in said other member opposite said transverse abutment and extending axially a sufficient distance to always be in alignment with said transverse abutment in the open position, means biasing said other member to the closed position, a flow path provided through said valve by movement to the open position when the pressure of fluid in said fluid passage reaches a predetermined value comprising a first portion from said fluid passage to said impact wall at substantially right angles thereto and directly opposed to the bias of said spring means, a second portion reversely directed from the impact wall to the transverse abutment wall to provide sufficient dynamic force application to the impact wall from the velocity head of the fluid to compensate for reduction in static force application to the impact wall from the pressure head of the fluid at the beginning of flow and increase in spring force due to the spring rate and deflection of the spring upon opening of the valve to eliminate valve chatter, and a third portion substantially transverse to the first and second portions directed outwardly through said fluid passage means without adversely affecting the velocity head force tending to open said valve and eliminate valve chatter.

6. A relief valve comprising relatively movable members, means mounting said members for movement between an open position permitting flow through said valve and a closed position preventing flow through said valve, one member having a fluid passage extending longitudinally therethrough substantially parallel to the path of movement of said members relative to one another, an annular flow reversing cavity formed in the other member opposite said fluid passage, an impact wall formed by the bottom of said annular cavity and extending substantially transversely to the path of movement of said members relative to one another and substantially transversely to the path of fluid flowing through said fluid passage toward said annular cavity, a tapered surface formed on the outer periphery of said one member about said fluid passage and extending into said annular cavity in the closed position and engaging the other member along an annular area of engagement, a transverse abutment wall formed on said one member at the end of said tapered surface, fluid passage means formed in said other member opposite said transverse abutment and extending axially a sufficient distance to always be in alignment with said transverse abutment in the open position, and means biasing said other member to the closed position.

7. A relief valve comprising a stationary member, nozzle means formed on said stationary member to deliver fluid under pressure, a movable member telescopically mounted on said stationary member for movement between an open position and a closed position relative to said nozzle means, a flow reversing cavity formed in said movable member opposite said nozzle means to receive and reverse flow from said nozzle means, a tapered surface formed about said nozzle means and extending from the end surface of said nozzle means adjacent said cavity rearwardly relative to the flow path in said nozzle means and terminating in a radially outwardly directed shoulder adapted to laterally change the reverse flow path, spring means biasing said movable member to the closed position, portions of said tapered surface being located within the cavity in the closed position, and seating means formed on said movable member about the periphery of said cavity and seating on said tapered surface in the closed position.

8. A relief valve comprising a first member, nozzle means formed on said first member to deliver fluid under pressure, a second member mounted for movement between an open position and a closed position relative to said nozzle means, a flow reversing cavity formed in said second member opposite said nozzle means to receive and reverse flow from said nozzle means, said cavity comprising an annular chamber having a diameter greater than the diameter of said nozzle means and a substantially flat wall extending transversely to the path of flow of fluid through said nozzle and having an area exposed to fluid pressure greater than the area of said nozzle means, a tapered surface formed about said nozzle means and extending rearwardly from the end surface of said nozzle means adjacent said cavity spring means biasing said second member to the closed position, portions of said tapered surface being located within the cavity in the closed position, and seating means formed about the periphery of said cavity and seating on said tapered surface in the closed position.

References Cited in the file of this patent

UNITED STATES PATENTS

| | | |
|---|---|---|
| 1,275,843 | Callan | Aug. 13, 1918 |
| 1,347,507 | Griffiths | July 27, 1920 |
| 2,506,737 | Paquin | May 9, 1950 |
| 2,754,841 | Eddy | July 17, 1956 |
| 2,917,072 | Saville | Dec. 15, 1959 |
| 2,995,147 | Bergquist | Aug. 8, 1961 |

FOREIGN PATENTS

| | | |
|---|---|---|
| 228,028 | Great Britain | Jan. 29, 1925 |
| 230,304 | Great Britain | Mar. 12, 1925 |